J. R. STEPHENS.
CAR AXLE BEARING.
APPLICATION FILED MAR. 28, 1921.

1,411,127.

Patented Mar. 28, 1922.
3 SHEETS—SHEET 1.

Inventor:
John R. Stephens.
By [signature]
Attorney.

J. R. STEPHENS.
CAR AXLE BEARING.
APPLICATION FILED MAR. 28, 1921.

1,411,127.

Patented Mar. 28, 1922.
3 SHEETS—SHEET 3.

Inventor:
John R. Stephens

By *Elliott* ~~~~~
Attorneys.

UNITED STATES PATENT OFFICE.

JOHN R. STEPHENS, OF ST. LOUIS, MISSOURI.

CAR-AXLE BEARING.

1,411,127.　　　Specification of Letters Patent.　Patented Mar. 28, 1922.

Application filed March 28, 1921. Serial No. 456,172.

*To all whom it may concern:*

Be it known that I, JOHN R. STEPHENS, a citizen of the United States, residing in the city of St. Louis and State of Missouri, have invented new and useful Improvements in Car-Axle Bearings, of which the following is a specification.

This invention relates to car axle bearings which improvements are particularly applicable to the constructions shown in my prior Patents No. 1,063,616 dated June 3rd, 1913, and No. 1,197,870 dated Sept. 12th, 1916, and to the construction shown in my pending application Ser. No. 407,652 filed Sept. 2nd, 1920.

In the case of the constructions of the two patents referred to, the supporting stirrup for the axle is separate from the bearing block on top of the axle and on which the car axle box rests. In the construction shown in the application referred to, the stirrup and bearing block are formed as an integral or unitary structure.

In the instant case the broad underlying principle may be adapted to either of the constructions referred to.

It is the general object of my invention to provide means for producing a more flexible construction of the bearing and particularly to provide for a yielding support for the stirrup, whether integral with or independent of the bearing block, so that the stirrup can be made of lighter construction and can more readily withstand the shocks incident to the use of the car on which the bearing is applied.

My improved bearings are intended for use particularly with mine cars which, as known, are subjected to very rough usage and to more excessive bumping and shocks than is the case with ordinary railway cars.

With the above object in view, the invention comprises essentially the provision of yielding means, preferably springs, for supporting the stirrup, so that when the wheels of the car pass over a rough place in the tracks, or the car is otherwise subjected to a sudden bump or shock, the downward throw of the axle will not have to be borne by the stirrup while it is held in a relatively fixed position, which requires the stirrup to be of considerable strength to withstand breakage, but the stirrup can yield and thus better withstand the sudden impact with the axle and be prevented from breaking. Furthermore, such yielding of the stirrup tends to prevent mashing and excessive wear of the same due to such impact therewith of the axle.

In the accompanying drawings—

Figure 1:
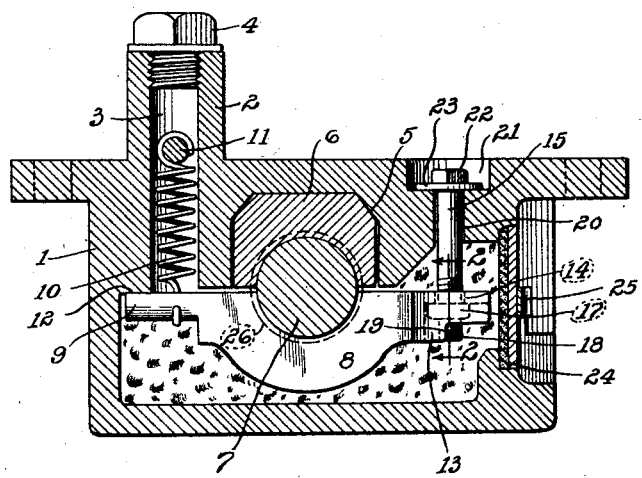
Figure 1 is a cross-sectional view through a car axle box, showing one form of my improved means for supporting the stirrup, the latter being independent of the bearing block.
Figure 2:
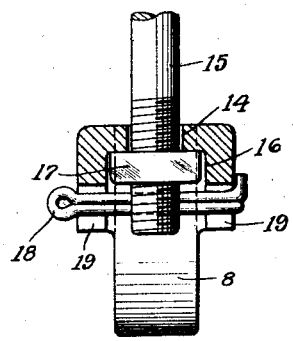
Figure 2 is a sectional view on an enlarged scale taken on the line 2—2 of Figure 1 and viewed in the direction of the arrows.
Figure 3:
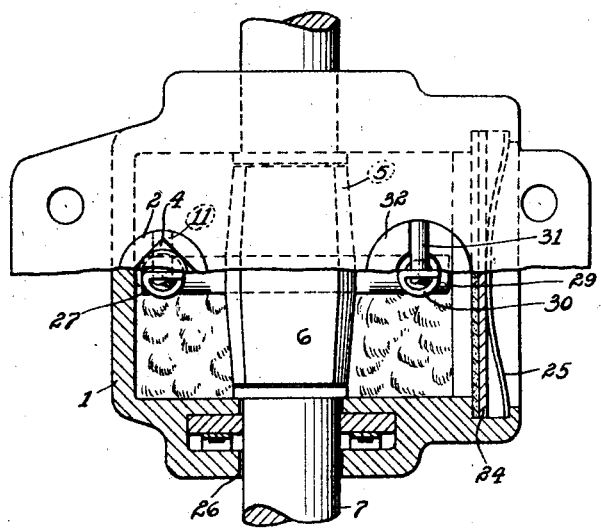
Figure 3 is a part plan and part sectional view illustrating a modification of the construction of Figure 1.

Referring now to the construction shown in Figure 1, the numeral 1 indicates a car axle box adapted to be secured on the under side of the car body in the usual manner and is provided on its upper side with a cylindrical extension 2 which is apertured to cover an oil duct 3 which extends through the top portion of the box to the interior thereof as shown. The said duct is closed at its upper end by a bolt 4. The top of the journal box is cut away on the interior to provide a recess 5 adapted to receive a bearing block 6 shown in plan view in Figure 3. This bearing block is circularly recessed on its under side to fit over the upper half of the axle 7. The numeral 8 indicates a stirrup which is circularly recessed on its under side to receive the lower half of the axle 7. The stirrup 8 is provided at one end with a semicircular extension 9 which is adapted to be engaged by the lower end of a coil spring 10, the upper end of which is secured over a cross pin 11 extending across and secured in the oil duct 3. The spring 10 supports one end of the stirrup 8 and operates normally to hold its upper flat side in contact with a shoulder 12 provided on the interior of the journal box at one side thereof. The opposite end of the stirrup 8 to that described, is enlarged in a lateral direction as indicated at 13, said enlarged portion being apertured as indicated at 14 to receive loosely the lower screwthreaded end of a bolt 15 and beneath said aperture is recessed, as indicated at 16, from the end inward to provide a space for a nut 17 and through which the lower end of said bolt is adapted to be screwed, said lower end being transversely apertured to receive a cotter pin 18 which bears against flat shouldered portions 19 provided on opposite sides of said recess 16 in the enlarged portion 13. The bolt 15 passes through a bolt hole 20 provided in the top of the journal box and which leads from the bottom of a recess 21 formed on the upper side of said journal box, and the head 22 of said bolt rests upon a washer 23 through which the bolt is passed and which washer is secured on the bottom of recess 21. The entrance to the interior of the journal box is through an opening at one end thereof, as usual, this opening being closed by a dust guard 24 held in place by a leaf spring 25 as shown in Figures 1 and 3. The openings in opposite ends of the journal box through which the axle 7 passes are of larger diameter than the axle, one of such openings being shown by dotted lines in Figure 1 and indicated by the numeral 26. Such an opening is similarly shown and indicated in Figures 4, 5 and 6. The similar opening at the opposite end is indicated in Figure 3. The purpose of making the openings 26 of larger diameter than the axle is to permit of a slight movement of the axle in any direction before the axle engages the edges of said openings, which tends to prevent mashing the edges of the opening by the consequent production of rough surfaces tending to cut the axle. The construction also reduces frictional engagement between the axle and the journal box and thus reduces the wear on these parts.

The bolt hole 15 and the aperture in the enlarged portion 13 of the stirrup through which apertures the bolt passes, as above described, are both of larger diameter than the bolt so as to permit of the rocking or swinging movement of the stirrup 8. The opposite end of the stirrup being supported by the spring 10, it will be seen that under any jar or shock under which the axle 7 would be thrown against the stirrup 8, the said end of this stirrup will yield against the resistance of the spring 10 and absorb a greater portion of the shock and thus minimize the force with which the axle will engage the edges of the openings 26. Further, as the stirrup will yield under the impact or pressure of the axle, the breaking strain which the stirrup must resist is thereby greatly reduced, so that said stirrup can be made much lighter in construction than in the case of the stirrups shown in my patents aforesaid, where the ends of said stirrups were held in a fixed position relative to a downward movement. Finally, it will be seen that the construction permits of the stirrup 8 swinging or rocking about the bolt 15 as a pivot to accommodate itself to different angular positions of the axle. The bearing block 6 is shaped on its upper side in the same manner as set forth in my patents referred to to permit it to accommodate itself also to different angular positions of the axle.

In the construction of Figure 1 the stirrup is not normally in contact with the bearing block 6, a slight space being left between them as shown, the movable end of the stirrup being arrested in its upward movement by the shoulder 12 on the inside of the journal box, as stated.

Figure 4:
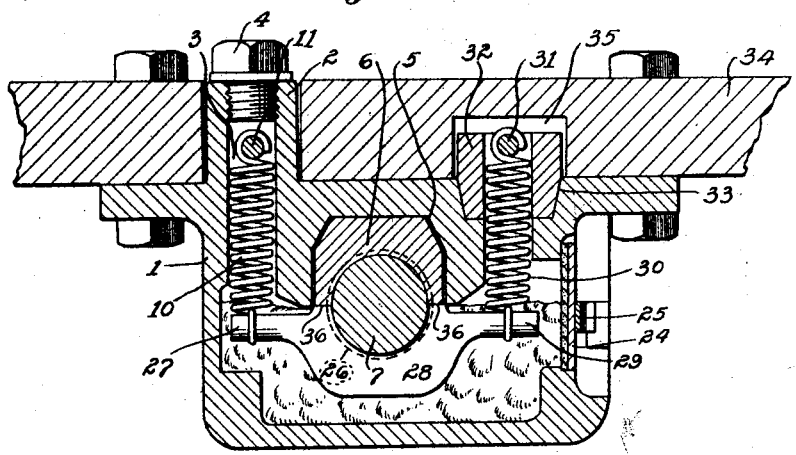
Figure 4 is a cross-sectional view through the journal box and illustrating the construction shown in Figure 3.

Referring now to Figures 3 and 4 the journal box as before is provided with the projection 2 providing an oil duct extending into the interior of the journal box and in which duct is located the coil spring 10 for engaging a projecting end 27 of a stirrup 28. The opposite end of the stirrup is provided with a similar extension 29 which is engaged by the lower end of a coil spring 30 the upper end of which is secured on a cross pin 31 which extends transversely across the bore of a tubular member 32 seated in a recess 33 in the journal box. The tubular member 32 projects some distance above the top of the box and the sill or frame 34 of the car is recessed as indicated at 35 to receive the projecting end of this tubular member and also to prevent it from displacement. In this construction the stirrup 28 is provided on its upper side on opposite sides of its axle-receiving recess, with shoulders 36 which engage the lower edge of the bearing block 6 centrally thereof. From the construction described it will be seen that the springs 10 and 30 normally hold the stirrup 28 in contact with the axle and with the bottom edge of the bearing block 6. The stirrup in this construction can yield at either end and it is likewise free to adjust itself to different angular positions of the axle.

Figure 5:
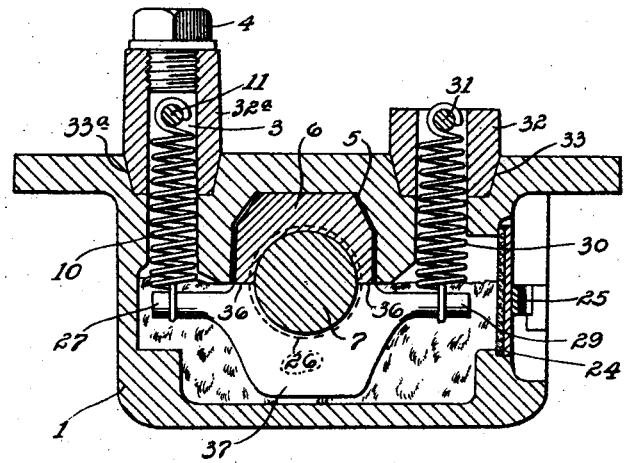
Figure 5 is a view similar to Figure 4 but illustrating a slightly modified construction thereof.

In the modification shown in Figure 5, substantially the same construction is employed as that shown in Figures 3 and 4 for supporting the stirrup, but in this case the stirrup is provided with a downwardly extending portion 37 which extends to within a short distance of the bottom of the journal box so that the bottom of the stirrup will strike the bottom of the journal box before the axle 7 will strike the edges of the openings 26, thus tending to prevent the edges of these openings from becoming mashed by sudden impact of the axle therewith. In order to facilitate mounting the spring 10 in the journal box, the tubular projection containing the oil duct 3 is constructed as a separate member and is seated in a recess 33ª in the same manner as the tubular member 32. It is indicated by the numeral 32ª.

Figure 7:
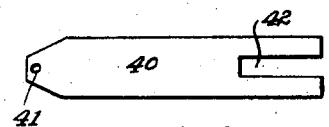
Figure 7 is a plan view of the shim used in the construction of Figure 6.
Figure 6:
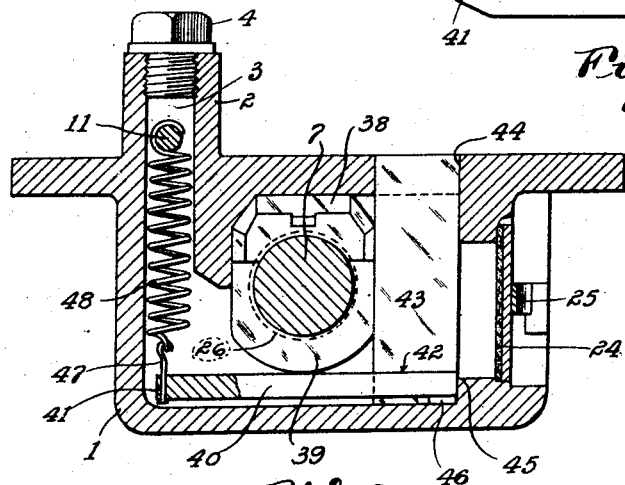
Figure 6 is a view illustrating another modification of the invention in which the bearing block and stirrup are integral.

The construction shown in Figure 6 is intended particularly for use with the type of bearing illustrated in application No. 407,652 referred to, in which the bearing block and stirrup are formed as a unitary structure, and is particularly designed for the construction shown in Figure 1 of said application. In this figure the numeral 38 indicates the bearing block and 39 the stirrup of the combined bearing block and support. The numeral 40 indicates a shim, as shown in Figure 7, which at one end is apertured at 41 and at its other bifurcated as indicated at 42. The numeral 43 indicates a locking plate which is rectangular in shape and is adapted to be inserted endwise through a correspondingly shaped aperture 44 provided in the top of the journal box. When so inserted the locking plate 43 is adapted to have its forward edge engaged more or less snugly with the inner side of the bearing block and support while the inner edge of said locking plate rests against the corresponding edge of the opening 44 and against the inner side of the projection 45 forming a sill of the opening to the journal box. The rear edge portion of the locking plate 43 at the bottom is adapted to be received between lugs on the bottom of the journal box, one of which is indicated at 46, to prevent lateral displacement of the locking plate, the bifurcated portion 42 of the shim 40, when the latter is in position, embraces opposite sides of the lower portion of the locking plate 43 and such end of the shim rests upon the lugs 46. The aperture 41 is provided with a staple 47 to which is secured the lower end of a coil spring 48, the upper end of which is secured to the cross pin 11 in the oil duct 3. The bottom edge of the stirrup 39 normally rests upon the shim 40 the latter being held in yielding engagement therewith by upward pull of the spring 48. In any downward movement of the axle 7 the stirrup 39 will be correspondingly moved and this movement will be yieldingly resisted by the shim 40 and as in the prior constructions will minimize the effect of the impact of the axle with the edges of the openings 26.

I claim:—

1. In combination with a car axle box, a car axle extending into the box, a bearing block mounted on the upper side of the axle and supporting said box, a support for engaging the under side of the axle mounted in the box and bodily movable independently of the latter, and means for yieldingly holding said support in engagement with the axle.

2. In combination with a car axle box, a car axle extending into the box, a bearing block mounted on the upper side of the axle and supporting said box, a support for engaging the under side of the axle mounted in the box and bodily movable independently of the latter, and means for yieldingly suspending one end of said support.

3. In combination with a car axle box, a car axle extending into the box, a bearing block mounted on the upper side of the axle and supporting said box, a support for engaging the under side of the axle mounted in the box and bodily movable independently of the latter, and means for mounting said support in the box in a manner to permit movement of the support independently of said bearing block, said means including a spring acting on one end of said support.

4. In combination with a car axle box, a car axle extending into the box, a bearing block mounted on the upper side of the axle and supporting said box, a support for engaging the under side of the axle mounted in the box and bodily movable independently of the latter, and yieldable means engaging either end of said support for maintaining it in contact with the axle.

5. In combination with a car axle box, a car axle extending into the box, a bearing block mounted on the upper side of the axle and supporting said box, a support for engaging the under side of the axle mounted in the box and bodily movable independently of the latter, and a pair of springs suspended at one end on the box and at the other engaging either end of said support for holding the same in yielding engagement with the car axle.

6. In combination with a car axle box, a car axle extending into the box, a bearing block mounted on the upper side of the axle and supporting said box, a relative narrow stirrup mounted in the box and bodily movable independently of the latter, said stirrup being positioned to support said axle and bearing block, and yieldable means for supporting said stirrup.

7. In combination with a car axle box, an upper rocking bearing for the axle extending longitudinally thereof and adapted to bear upon and have rolling contact with the upper inner surface of the box, a stirrup extending at right angles to and beneath the axle, and springs connected with the axle box and engaging either end of said stirrup for suspending said stirrup in the box in yielding engagement with said axle.

8. In combination with a car axle box, an upper bearing block and a lower support for the car axle, springs mounted on the journal box and engaging either end of said support for holding it in yielding contact with the car axle, said support having a downward projecting portion located in proximity to the bottom of the car axle box to engage the same under excessive movement of the axle in advance of the engagement of the axle with the openings in the box through which it passes.

9. In combination with a car axle box, an upper bearing block and a lower support for the axle, means for mounting said support in the car axle box to maintain it in engagement with the axle, said means including a coil spring engaging one end of said support and an apertured member seated in the top of said box having means for supporting said spring.

In testimony whereof, I have hereunto set my hand.

JOHN R. STEPHENS.